US012488708B2

(12) United States Patent
Tiainen et al.

(10) Patent No.: US 12,488,708 B2
(45) Date of Patent: Dec. 2, 2025

(54) LINERLESS LABEL PRODUCT, MANUFACTURING A LINERLESS LABEL PRODUCT AND USE OF A LINERLESS LABEL PRODUCT FOR DELIVERY OF ORDERS

(71) Applicant: UPM Raflatac Oy, Tampere (FI)

(72) Inventors: Marko Tiainen, Jyväskylä (FI); Katarzyna Wojtuś, Helsinki (FI); Markus Pääkkönen, Tampere (FI); Janne Valkama, Valkeakoski (FI)

(73) Assignee: UPM RAFLATAC OY, Tampere (FI)

( * ) Notice: Subject to any disclaimer, the term of this patent is extended or adjusted under 35 U.S.C. 154(b) by 392 days.

(21) Appl. No.: 17/913,566

(22) PCT Filed: Mar. 26, 2021

(86) PCT No.: PCT/FI2021/050214

§ 371 (c)(1),
(2) Date: Sep. 22, 2022

(87) PCT Pub. No.: WO2021/191506

PCT Pub. Date: Sep. 30, 2021

(65) Prior Publication Data

US 2023/0108262 A1 Apr. 6, 2023

Related U.S. Application Data

(60) Provisional application No. 63/000,660, filed on Mar. 27, 2020.

(51) Int. Cl.

| | |
|---|---|
| ***G09F 3/10*** | (2006.01) |
| ***B31D 1/02*** | (2006.01) |
| ***G09F 3/02*** | (2006.01) |

(52) U.S. Cl.
CPC ................ *G09F 3/10* (2013.01); *B31D 1/02* (2013.01); *G09F 3/02* (2013.01); *B31D 2201/02* (2013.01);
(Continued)

(58) Field of Classification Search
CPC ...... G09F 3/10; G09F 3/02; G09F 2003/0202; G09F 2003/0241; G09F 2003/0258;
(Continued)

(56) References Cited

U.S. PATENT DOCUMENTS 3,892,901 A 7/1975 Smith
5,661,099 A 8/1997 Mitchell, Jr.
(Continued)

FOREIGN PATENT DOCUMENTS

DE 20216483 U1 4/2003
WO 2007136767 A2 11/2007
(Continued)

OTHER PUBLICATIONS

International Search Report for the corresponding International Application No. PCT/FI2021/050214; International Filing Date: Mar. 26, 2021; Date of Mailing: Jun. 10, 2021; 6 pages.
(Continued)

*Primary Examiner* — Gary C Hoge
(74) *Attorney, Agent, or Firm* — CANTOR COLBURN LLP

(57) ABSTRACT

This specification relates to a linerless label product intended for end uses having a short label-life and requiring manual handling, repositionability and/or removability together with lean sustainable and economical structure. A linerless label web (631, 741) comprising a direct thermal printable face (210, 630, 740) and a pressure sensitive adhesive (220) is provided. The linerless label web (631, 741) comprises the pressure sensitive adhesive (220)
(Continued)

arranged in one or more machine-direction continuous stripes leaving one or more non-adhesive area(s) between said machine-direction continuous stripes in a cross direction of the linerless label web. A total coverage of the pressure sensitive adhesive (220) in the cross direction of the linerless label web is less than 70%, or less than 50%, or less than 30%. Further, a manufacturing method of a linerless label web (631, 741), a linerless label product roll (200) as well use of the linerless label web (631, 741) or the linerless label product roll (200) in on-demand printing for preparation and delivery of orders are provided.

12 Claims, 5 Drawing Sheets

(52) U.S. Cl.
CPC ................ *G09F 2003/0202* (2013.01); *G09F 2003/0241* (2013.01); *G09F 2003/0258* (2013.01)

(58) Field of Classification Search
CPC ........... G09F 3/0211; G09F 2003/0214; G09F 2003/0225; G09F 2003/0227; G09F 2003/0229; G09F 2003/0248; B31D 1/02; B31D 2201/02
See application file for complete search history.

(56) References Cited

U.S. PATENT DOCUMENTS

| | | | | |
|---|---|---|---|---|
| 5,782,496 | A | 7/1998 | Casper et al. | |
| 9,058,753 | B2 | 6/2015 | Van Boom et al. | |
| 9,613,547 | B2 | 4/2017 | Weiner et al. | |
| 2004/0067088 | A1* | 4/2004 | Kline | B31D 1/021 400/615.2 |
| 2015/0159034 | A1* | 6/2015 | Wild | G09F 1/00 106/206.1 |
| 2015/0161915 | A1* | 6/2015 | Wild | C09J 7/22 428/352 |
| 2015/0279242 | A1* | 10/2015 | Parks | G09F 3/02 428/41.7 |
| 2016/0293063 | A1* | 10/2016 | Weiner | G09F 3/02 |
| 2017/0092158 | A1 | 3/2017 | Roth et al. | |
| 2017/0124920 | A1* | 5/2017 | Anderson | G09F 3/10 |
| 2018/0053446 | A1* | 2/2018 | Hill | C09J 7/29 |
| 2020/0365061 | A1* | 11/2020 | Shinkle, II | G09F 3/10 |
| 2023/0162623 | A1* | 5/2023 | Ambartsoumian | B32B 27/308 428/42.2 |
| 2024/0087478 | A1* | 3/2024 | Wittmeyer, Jr. | C09J 201/00 |
| 2024/0112173 | A1* | 4/2024 | Parks | G06Q 20/342 |
| 2024/0233581 | A1* | 7/2024 | Hill | C09J 7/29 |

FOREIGN PATENT DOCUMENTS

| | | | |
|---|---|---|---|
| WO | 2013142834 | A2 | 9/2013 |
| WO | 2016147630 | A1 | 9/2016 |

OTHER PUBLICATIONS

Written Opinion for the corresponding International Application No. PCT/FI2021/050214; International Filing Date: Mar. 26, 2021; Date of Mailing: Jun. 10, 2021; 9 pages.

* cited by examiner

LINERLESS LABEL PRODUCT, MANUFACTURING A LINERLESS LABEL PRODUCT AND USE OF A LINERLESS LABEL PRODUCT FOR DELIVERY OF ORDERS

CROSS-REFERENCE TO RELATED APPLICATIONS

This application is a National Stage application of PCT/FI2021/050214, filed Mar. 26, 2021, which claims benefit of Provisional Application No. 63/000,660 filed on Mar. 27, 2020, both of which are incorporated by reference herein in their entirety.

TECHNICAL FIELD

This specification relates to a linerless label product and a method for manufacturing a linerless label product. Further, this specification relates to use of a linerless label product in on-demand printing for preparation and delivery of orders.

BACKGROUND

Fast food restaurants are an example of businesses which are nowadays digitalizing their services by providing ordering via mobile applications and internet, or locally via restaurant located touch-screen order kiosks. Both of these approaches reduce need for having personnel occupying full time service counters or other point of sales. This development is reflecting also as changes in the internal work processes of such service establishments. One element facilitating this development are removable and/or repositionable, short-lived labels which are printed on-demand in the restaurant after the order has been made and then used during the preparation and delivery of the orders. On one hand these labels may help to correctly compile the different components of the order and to ensure that the full order is ready for the customer. On the other hand, the customer can easily check the content of the order from the label(s) and perhaps share the dishes among a group if the same order has contained products for several people. Further, in some cases these labels may also function as sealing labels to ensure that the customer receives the order as packaged and closed by the kitchen personnel.

There is a need to provide a linerless label product for such fast food or other similar use, wherein the labels are on-demand printed on site with a compact label printer and then the individual labels are manually dispensed, and may be also manually repositioned one or more times. Such labels have a relatively short use life of typically from some minutes to some tens of minutes from printing until disposing. Such end use calls for a label product providing overall cost effective design, dependable performance in compact linerless printers in fast-paced customer service environment and also lean design from sustainability point of view.

SUMMARY

This specification aims to provide a linerless label product intended for end uses having a short label-life and requiring manual handling, repositionability and/or removability together with lean sustainable and economical structure.

According to an embodiment, a linerless label web comprising a direct thermal printable face and a pressure sensitive adhesive is provided. The linerless label web comprises the pressure sensitive adhesive arranged in one or more machine-direction continuous stripes leaving one or more non-adhesive area(s) between said machine-direction continuous stripes in a cross direction of the linerless label web. A total coverage of the pressure sensitive adhesive in the cross direction of the linerless label web is less than 70%, or less than 50%, or less than 30%.

According to another embodiment, a manufacturing method of a linerless label web is provided. The linerless label web comprises a direct thermal printable face and a pressure sensitive adhesive, and is designed for on-demand printing for preparation and delivery of orders. The method comprises

- applying a water based pressure sensitive adhesive on a carrier,
- drying/curing the water based pressure sensitive adhesive on the carrier,
- transferring the water based pressure sensitive adhesive onto the direct thermal printable face,
- arranging a total coverage of the water based pressure sensitive adhesive in cross direction of the linerless label web to be less than 70%, or less than 50%, or less than 30%, and
- winding the direct thermal printable face with the dried adhesive thereon into a roll of linerless label web.

According to another embodiment, a linerless label product roll is provided. The linerless label product roll is manufactured by machine-direction slitting of the linerless label web as disclosed above.

According to yet another embodiment, a linerless label product roll is provided. The linerless label product roll is manufactured by machine-direction slitting of a linerless label comprising multiple label widths. The multiple label widths of the linerless label web differ in the positioning, width and/or number of the machine-direction continuous stripe(s) of the pressure sensitive adhesive.

Further, use of the linerless label web or the linerless label product roll in on-demand printing for preparation and delivery of orders is provided.

Further embodiments are presented in the dependent claims.

The figures are schematic. The figures are not in any particular scale.

DETAILED DESCRIPTION

The solution is described in the following in more detail with reference to some embodiments, which shall not be regarded as limiting.

In this specification term "comprising" may be used as an open term, but it also comprises the closed term "consisting of". Unit of temperature expressed as degrees C. corresponds to ° C.

Term "web" refers to a continuous sheet of material. The web is generally processed by moving over rollers. Between processing stages, webs may be stored and transported as rolls.

Term "machine direction" refers to manufacturing direction of a web. Machine direction may also refer to a circumferential direction of a roll. Term "cross direction" or "cross machine direction" refers to a direction that is transversal to the machine direction. Longitudinal direction of a web refers to the machine direction.

The general properties of the on-demand compact printers are first discussed to clarify the requirements for the label product and fast food restaurant use examples are also discussed to demonstrate requirements arising from the manual label dispending, repositioning and other end use related aspects. The properties of the label product and main components of the label structure are discussed in more detail. Finally, the manufacturing methods optimised to manufacture such label product are described.

It should be understood that fast food restaurants as specific end use are only discussed herein as an example and in order to highlight the label product features and performance required in such end use. A linerless label product disclosed herein is intended for any similar end use having a short label-life and requiring manual handling, repositionability and/or removability together with lean sustainable and economical structure.

Figure 1:
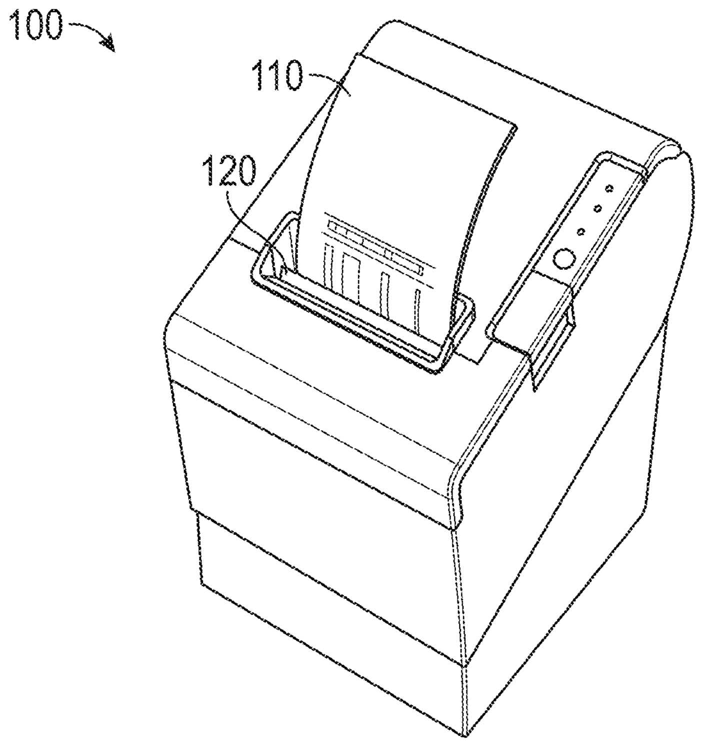
FIG. 1 illustrates, by way of an example, a schematic representation of an on-demand label printer 100 typically used with linerless labels according to the disclosure.
Figure 2A:
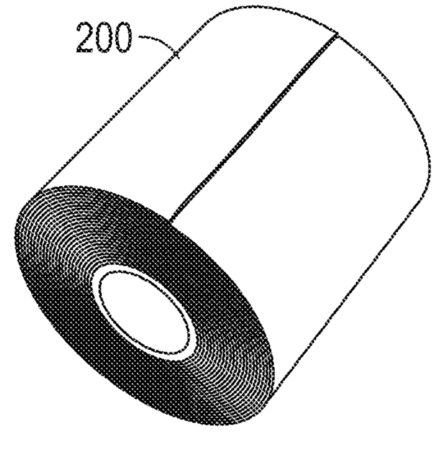
FIG. 2*a* illustrates, by way of an example, a schematic representation of a linerless label product roll 200 according to the disclosure.
Figure 2B:
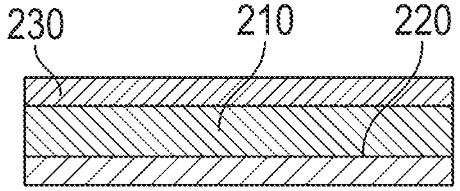
FIG. 2*b* illustrates, by way of example, a schematic representation of a linerless label web according to an embodiment.

On-Demand Linerless Direct Thermal Label Printers and Manual Handling of Printed Labels FIG. 1 shows schematically an example of an on-demand label printer 100 used together with a linerless label product according to the disclosure. Term "linerless printer" refers to a printer that is arranged to print linerless labels. FIG. 2*a* shows schematically an example of a linerless label product roll 200 usable in such printers. Label product roll may also be referred to as a (linerless label) customer product roll, customer roll or product roll. FIG. 2*b* shows schematically a linerless label web having a thermally printable substrate 210, i.e. a face, with pressure sensitive adhesive 220 and optional release coating 230. The linerless label web refers to a continuous web comprising a face and pressure sensitive adhesive, wherefrom the individual labels, i.e. the label products, may be separated. The linerless label web comprises at least one label width.

Business environments where such on-demand label printers are used typically call for very compact size and ease of use of those printer devices with minimal need for servicing. Firstly, this leads to a solutions which utilize direct thermal printable label materials which themselves carry the thermally sensitive printable coating. This deviates from other non-direct thermal printing methods utilizing, for example, separate thermal print ribbons that need to be loaded into the printers and replaced after use accordingly. Secondly, this leads to technical solutions, wherein the number of individual components in a direct thermal printer are minimized and further each of the components are selected to have minimal complexity. Preferably, the printer is also made very simple to use and has, for example, minimal need for any settings and adjustments.

Main functional parts inside such a compact linerless label printer may comprise: a mechanism for conveying a label web through the printer, a thermal print head for printing the individual labels onto the label web and a mechanism for separating individual labels from the label web and providing them for manual dispensing.

The mechanism for conveying the label web starting from unwinding the web from the label roll through all various parts of the printer and finally outputting the individual labels is typically a series of guidance rolls and guidance surfaces. To minimize both the size and complexity of such a unit, most of the rolls are freely running and perhaps only one or only a few of them are motorized in order to traction the label web forward during printing. These rolls or surfaces may not utilize any special friction lowering coatings for cost effective structure. The traction roll(s) may also comprise simple plastic or rubber roll without any special coating but solely with a surface roughened in order to ensure traction. Typically a single printer model is also designed to accept different widths of label rolls using a simple adapter to center the roll with respect to the web trajectory. Such a simple yet effective and economical printer design places severe demands on the label material in order to ensure smooth operation in customer service oriented work. Typical challenges are related to pressure sensitive label web sticking inside the printer to its various components and preventing smooth forward traction of the label web, and/or accumulation of adhesive residue onto printer components in prolonged use leading to the aforementioned problems and requiring cleaning of the printer components.

The thermal print head in this type of compact printers is typically selected to use lower print energies, i.e. less thermal energy may be transferred into the thermo-sensitive layers of the linerless label web. This is preferable in this type of applications wherein short-lived labels are to be printed in a simple and economical manner. Even if the print heads could be adjusted for higher energy levels or temperatures, it may be preferable to run them on lower settings in order to maximize the use life of the thermal head/printer.

In order to print, the thermo-sensitive linerless label web may be tractioned via a gap between the thermal head and a platen roller. The printer sends an electric current to the heating elements of the thermal head, which generate heat. The heat activates the thermo-sensitive colouring layer of the thermosensitive paper, which changes colour to black where heated. Such a printing mechanism is known as a thermal printing system or direct thermal printing system. The heating elements are usually arranged as a line of small closely spaced dots. The printing energy (temperature and/or exposure time) may be adjustable, but such adjustments tend to be tedious and preferably a direct thermal printable label material should be selected in order to work without a need to fine tune the printer properties. If more printing energy is required, this typically means that the printing speed is slowed down allowing the printing temperature to affect the label for longer time and therefore transferring more energy to the web. Therefore, the performance of the print head has an effect on selection of the thermal face material of the linerless label product in order to ensure good quality printing even with lower print energy/heat levels and higher printing speed.

The mechanism arranged in the output side of the printer for separating individual printed labels from the continuous linerless label web may comprise various types of electrically motorized cutting blades or guillotines or in many cases just simple non-movable serrated cutting blades (shown in FIG. 1 with ref. 120). The latter requires the user to manually tear the label web against the serrated or toothed blade. In any case, the user needs to manually grasp the printed label that has been offered out from the printer. When using a non-motorized or non-assisted cutting mechanism, the user needs to rather firmly grip the label to manually separate it from the continuous web. This again places requirements for the label material so that it will not unnecessarily stick to the cutting mechanism of the printer or the fingers of the user who needs to be able to conveniently position the label into its first labelling position.

In the following, the fast food restaurant on-demand repositionable labels utilized during the preparation and delivery of the meal orders is used as an example to further clarify various requirements for such short-lived manually dispensed labels.

The meal order is first made either remotely via internet or locally in the restaurant via self-service touch-screen order kiosk or at the service desk. After the order and sales have been confirmed then one or more labels are printed for the order. For example, at the drink station one or more labels may be printed for the drinks and attached onto the appropriate cups. In the kitchen, one or more labels are printed for the various parts of the meal, for example for different burgers and other dishes or side-dishes. After the various dishes have been prepared and individually boxed or wrapped, then the appropriate labels are individually attached to each of the dishes. If applicable and especially for a larger order, a compilation or summary label may also be printed and used to help to compile and check that all dishes included in the order have been prepared and included before delivering the order to the customer.

During the preparation of the order, the various individual labels may manually attached and then repositioned one or more times prior to their attachment to the final positions on different packages/dishes. This need depends on how the internal process in the restaurant has been arranged. Further, one of the labels, for example a compilation label, may be attached outside a takeaway bag or package for the convenience of the customer. Or in a case that a meal transport service for example to home or office location is used, for the convenience of the transport service personnel, the compilation label may be attached in order to provide, for example, customer identification and address. There might be several compilation labels with identical or different information content printed for the same order for these different purposes. The transport service personnel may in some cases even detach some of the labels and use them during transportation service as notes when planning their route and timing.

In addition to being used for multiple informational purposes during preparation and delivery of the orders, one or more of the on-demand printed linerless labels may have further multi-functional use as sealing labels for the packages of individual dishes, or as sealing or luggage tag type labels for takeaway bags or packages. A luggage tag is a label which is wrapped around the handle of a luggage, in this case typically around the handle of a takeaway or delivery bag. The luggage tag label adheres onto itself as loop around the handle leaving the sticky adhesive side facing inwards and printed side facing outwards. In a takeaway or delivery bag such a luggage tag can be thus used both as a sealing label as well as identification label during the transport or for the end user.

The fast food restaurant customer as the end user may exploit the information printed on the various labels to check the content of the order and for helping to share the dishes between the persons participating in the same order. If the labels have been used to seal any of the individual boxes or wraps etc., the customer needs to manually remove or reposition the labels before they become discarded finally as waste together with the other packaging material.

Typically the manufacturers of the on-demand compact printers aim to provide printers with cutting blades or guillotines having a total lifetime of 1 million cuts. A maintenance interval of at least 100 000, even 500 000 cuts for the printer is desired. It is estimated that one on-demand printer may be arranged to print even more than 500 000 labels per year. Thus, the linerless label material used for printing with said printers must be chosen such that it can maintain its operationality under such conditions. Typical challenges caused by the label materials, adhesive in particular, already discussed above, namely pressure sensitive label web sticking inside the printer to its various components and preventing smooth forward traction of the label web, and/or accumulation of adhesive residue onto printer components in prolonged use leading to the aforementioned problems and requiring cleaning of the printer components can be minimized and thus the performance of the printer can be assured by proper label material selection.

As evident from the above description regarding the on-demand compact printers and their use in fast food restaurants or similar other applications fast-paced customer service end uses, there are multitude of requirements placed on the linerless label product in order to provide cost-efficient, efficient and trouble-free operation in a user friendly and sustainable manner.

In the following, a linerless label product fulfilling these requirements is described in more detail together with a method for manufacturing the same.

Linerless Label Product and its Components

An on-demand compact printer may accept linerless label rolls with widths ranging, for example, from 10 to 100 millimetres. Quite commonly used widths can be found around in the middle of the aforementioned range, i.e. between 40-60 millimetres. One example of a label width is 57 mm. Such a label width is used herein as an example.

Depending on a diameter of the label roll and thickness of the linerless label material, a single roll may contain, for example, 10-100 metres of label material. One example is 40 m per roll. Such a length of label material in a roll is used herein as an example.

Face

Term "face" refers to a top substrate of a label, also called as a face stock, a face material, face substrate or in case of plastic material a face film. The face may have a monolayer or multilayer structure comprising at least two layers. The face is the layer that is adhered to the surface of an article during labelling through an adhesive. A combination comprising a face and adhesive may be referred to as an adhesive label.

A substrate 210 for a face of an on-demand printable linerless label may comprise a base paper comprising natural fibre(s) as its main raw material. The base paper may be coated with one or more coating(s). The base paper may also be uncoated.

The base paper may comprise, for example, one or more fillers and/or additives. Natural fibre refers to any plant material that contains cellulose. The natural fibre may be wood-based.

The substrate 210 for a face may also comprise a filmic material such as polypropylene (PP) or biaxially oriented polypropylene (BOPP). Also other suitable materials, such as different types of polyesters such as polyethylene terephthalate (PET) or polyethylene(s) are possible.

In order to achieve on-demand thermal printability, the paper or filmic substrate of the face comprises a thermal coating. The thermal coating is arranged to form a thermal sensitive, reactive layer changing colour during the thermal printing. The thermal coating comprises reactive components. The thermal coating may comprise a matrix. The matrix may comprise a dye and a developer. The face may be called thermally direct printable face.

The dye may comprise a leuco type dye. The thermal coating matrix in a solid state is heated by a thermal print head above its activation- and/or melting point. The leuco dye is arranged to react with an acid and change into a coloured form. Thermal coating may comprise a dye, a developer, a sensitizer, a binder, stabilizer.

Above activation temperature during thermal printing the developer is arranged to co-react with the dye. Reaction of the dye with the developer is arranged to trigger colour formation. Developer may comprise sulfonyl ureas, zinc salts of substituted salicylic acids or phenols, for example Bisphenol A (BPA) or Bisphenol S (BPS). The thermal coating may preferably be BPA free, Bisphenol (BP) free or Phenol free for increased chemical safety.

Sensitizer may be used in a thermal coating to decrease melting point of a dye and/or a developer. Dye and developer are arranged to react when heated above melting point of matrix of the thermal coating. The melting point of the matrix may depend on melting point values of its components. Thermal threshold of the thermal coating is melting point of the component of the thermal coating having the lowest melting point. Sensitizer of the thermal coating is arranged to decrease melting point of dye and/or developer. This has effect of proving accuracy to the melting point and/or optimizing temperature of colour change and/or facilitating mixing of dye and developer.

Optionally the thermal coating may comprise stabilizers. Dyes in thermally sensitive paper may be unstable tending to return to their original colourless crystalline form. The thermal paper is sensitive to hot and humid external conditions, for example. In order to stabilize the metastable glass formed by leuco dye, developer and sensitizer, a stabilizer may be added to the mixture. Stabilizers have effect of inhibiting recrystallization of the dye and developer and/or stabilizing the print.

Binder of the thermal coating may have effect of facilitating the thermal coating to adhere to a base substrate or to a pre-coat. Binder may comprise double bonds. The binder may comprise polyvinyl alcohol (PVA) or latex, for example a styrene butadiene latex (SB) or a styrene acrylic (SA).

The face may be pre-coated. A pre-coat may have effect of reducing heat transfer from a thermal coating to the base substrate. This may enable enhanced or high resolution print to be formed. The pre-coat may have effect of providing smoothness to the substrate, i.e. the face. Smoothness of the substrate such as paper has positive effect on printing, for example by providing better resolution. The pre-coat may have positive effect on printing quality.

Sensitivity of the thermal coating refers to the degree to which it reacts to a given amount of heat or energy. Sensitivity is a decisive factor in the selection of the right thermal coating or thermal paper. It may be depicted in graphs plotting a curve of image density or optical density (OD) against the amount of heat or energy transferred. Optical density is a measure of a relationship between incident and reflected light. An optical density of approx. 1.1 is usually a full black to the human eye. Lower optical densities thus correspond to varying shades of grey. Thermal coatings and thermal papers are typically characterized by using static and dynamic sensitivity.

Static Sensitivity

Static sensitivity indicates the temperature at which a thermal paper will begin imaging, i.e. changing colour. Thermal papers with low static sensitivity only begin imaging at high temperatures, for example at above 90 degrees C.

Thermal papers with medium static sensitivity on the other hand begin imaging at lower temperatures, for example at between 80 and 90 degrees C. High static sensitivity thermal papers start to react even at lower temperatures, for example at 65-80 degrees C., or at 70-80 degrees C.

Dynamic Sensitivity

Dynamic sensitivity of thermal papers indicates in practise how fast a thermal paper can be printed. This is especially relevant in the selection of the right thermal paper for a particular thermal printer, since the higher the dynamic sensitivity of the paper, the faster the printer can operate without any settings having to be changed. Dynamic sensitivity is typically indicated as $mJ/mm^2$. Thus, thermal papers with low dynamic sensitivity require higher print head temperature and/or longer exposure, i.e. slower printing speed to achieve high optical density of the image. On the other hand high dynamic sensitivities allow faster printing even with lower print head temperatures.

Dynamic sensitivity is challenging to categorise by using unambiguous, single numerical values (for example energy levels in $mJ/mm^2$) into low, medium and high categories because the total energy level delivered into the paper does not directly correspond to a certain temperature reached in the thermal coating. The heat capacity of the thermal paper is related, for example, to the thickness of the paper and existence of different material or material layers. Thus different amount of energy may be needed to heat papers having different thicknesses to the same temperature. Different paper thicknesses or thermal conductivity of various layers may cause different temperature levels in the thermal coating.

Figure 9:
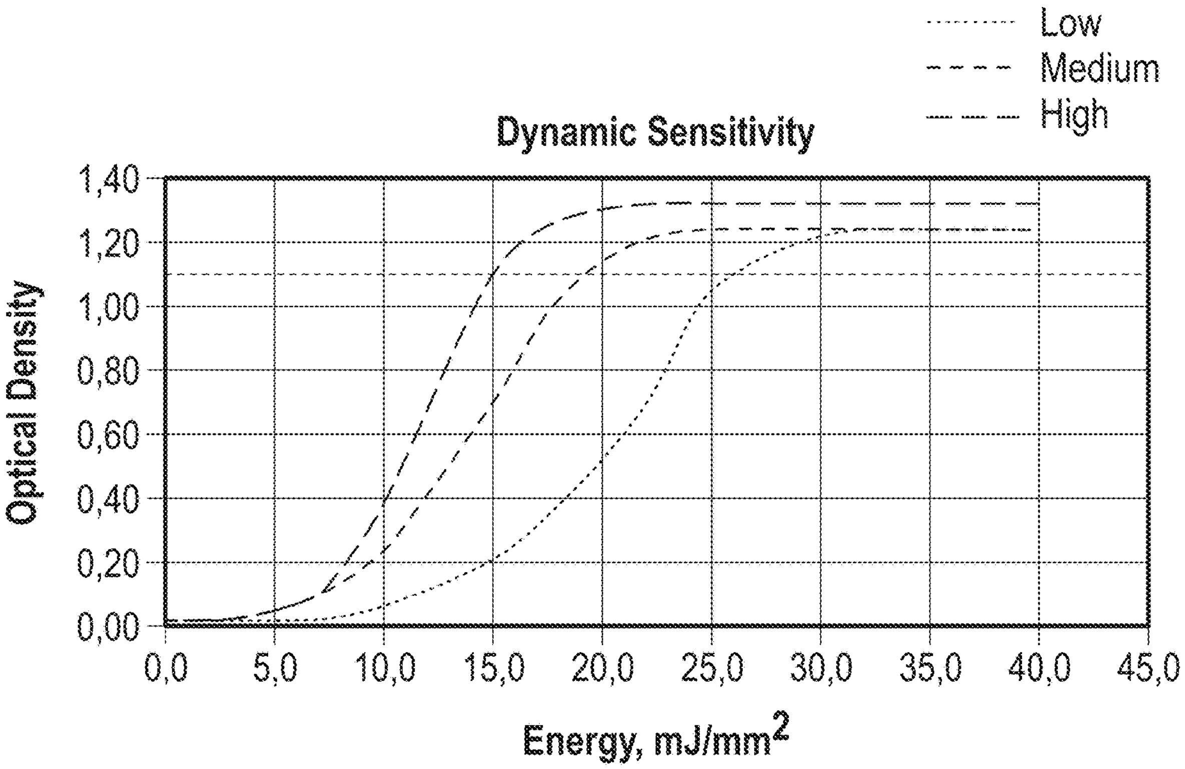
FIG. 9 illustrates, by way of an example, dynamic sensitivity behaviour of low/medium/high categorized direct thermal papers.

FIG. 9 shows schematically an example of different dynamic sensitivity curves for a thermal paper horizontal axis given as $mJ/mm^2$ and vertical axis given as optical density. As can be seen, for example at optical density 1.1 (full black for a human eye) very different energy levels may be required to reach such full colour change in the thermal coating layer. A high dynamic sensitivity thermal paper may reach such optical densities already at energy levels below 15 $mJ/mm^2$, a medium dynamic sensitivity may require something around 20 $mJ/mm^2$, for example energies in the range of 15-25 $mJ/mm^2$, and a low dynamic sensitivity thermal paper may require energy levels even above 25 $mJ/mm^2$ for the same darkness of the print. Each of these papers may still start to have some colour change in much lower energy levels, for example, already below 10 $mJ/mm^2$.

The thermal coating/thermal face substrate properties may be selected in such a manner that the print activation/melting temperature is relative low enhancing the printability in compact and economical on-demand linerless printers. This ensures good printability even with lower end print heads and without a need to make any printer unit specific adjustments. This also creates wider performance tolerance between individual printer units without significant change in the print quality. Therefore, in these labels high static sensitivities are preferred combined with high dynamic sensitivity allowing fast printing with economic and simple linerless printers. Temperature of the surface of a labelled item is not likely to exceed 65-70 degrees C., which allows the use of some thermal papers with medium static sensitivity, and more preferably thermal papers with high static sensitivity approaching those maximum surface temperatures of the labelled items. On the other hand, long term stability is not an issue in these short-lived applications making it possible to use more economical thermal papers which are not designed specifically for archiving or longer term stability.

However such high static and dynamic sensitivity of the thermal coating/paper places challenges in manufacturing of the direct thermal printable linerless labels because it sets limit to the highest temperatures that the direct thermal face material can be exposed to during manufacturing of the linerless label product in order to prevent unwanted and premature colour changes of the thermally sensitive coating. This challenge is solved by specific manufacturing methods explained in detail later in this description.

Some examples of suitable properties of the direct thermal face materials are given in the following with their parameters:

- Static sensitivity below 90 degrees C., or preferably below degrees 80 C.
- Dynamic sensitivity for obtaining optical density of 1.1 below 25 $mJ/mm^2$, or preferably below 20 $mJ/mm^2$ or even more preferably below 15 $mJ/mm^2$
- Base weight 50-80 $g/m^2$, preferably 70-80 $g/m^2$ according to ISO536
- Caliper 60-85 μm according to ISO534
- Smoothness 350-550 sec (Beck) according to ISO5627
- Brightness higher than 85% (R457) according to ISO2469
- Opacity higher than 80% according to ISO2471
- Tensile strength in machine direction higher than 45 N/15 mm according to ISO1924/2
- Tensile strength in cross direction higher than 10 N/15 mm according to ISO1924/2
- Paper substrate preferably manufactured from FSC™—certified (mix credit) pulp Optional Release Coating The thermally printable face substrate of the linerless label product disclosed herein may comprise a further release coating 230 on top of the substrate 210. Thermal printing may be made through this release coating. Said release coating is intended to make the label material self-woundable, that is, the linerless label web with pressure sensitive adhesive 220 on its one side (bottom side) and release coating 230 on its other side (top side) can be self-wound around itself without tendency of blocking the adjacent layers of the label web to each other.

The release coating may comprise a silicone based or non-silicone based release coating. A silicone based release coating may comprise UV curable silicone, for example UV free radical silicone or cationic UV silicone. The release coating may comprise one or more layers of release coating.

Non-thermally curable release coatings are preferable, for example UV curable silicone, because curing of such layers will not heat the thermally sensitive materials in the thermally direct printable face.

It is also possible that no specific release coating is needed if the adhesion of the face substrate 210 is low enough so that the pressure sensitive adhesive 220 can be readily released from the face material upon unwinding the linerless label product roll 200.

A further function of the release coating 230 may be that it provides lower friction against the print head of the printer and/or against other mechanical components of the printer minimizing wear of those components and minimizing adhesive residue built up.

Pressure Sensitive Adhesive

The thermally printable linerless label product disclosed herein comprises a pressure sensitive adhesive (PSA) coating arranged on a lower surface of the face opposite to its printable top surface. A pressure sensitive adhesive coating may also be called a self-adhesive coating. The pressure sensitive adhesive coating may comprise one or more layers of pressure sensitive adhesive. The PSA may be removable or repositionable.

In principle, the PSA suitable for a linerless label product may be any PSA providing at least one, preferably all of the following properties:

- good anchorage of the adhesive to the label face in order to prevent any adhesive residue accumulation in the printer,
- reliable adhesion/tackiness of the adhesive for all of those different types of surfaces onto which the label will be manually dispensed or applied either during the preparation of the order (for example in the kitchen) and then when labelling the various items of the order (for example cups, boxes, wraps, bags or other packages),
- easy repositionability needed when the label is first applied onto a surface and then repositioned onto another surface (for example label used first in the kitchen as note and then labelled onto the ready-made dish),
- easy removability (for example the customer removing the label used as closure or seal for a package),
- chemistry suitable either for direct or indirect food contact,
- sustainability supporting the short life of such labels, i.e. chemistry which does not create undue burden to the environment or call for any special waste management procedures compared to other waste that becomes generated in the processes and activities where such labels are used.

Such adhesives may be in general described as removable or in some case ultra-removable adhesives. Such adhesives may be water based, solvent based or hot melt adhesives.

Taking into account the nature of the end use applications, water based PSA adhesives provide further benefits, for example, better sustainability with less fossil based raw materials and less volatiles involved both during the manufacturing and during end use. These benefits can be seen, for example via Life Cycle Analysis for Cradle-to-Gate or Cradle-to-Grave.

Further, it has been noticed that water based PSA improves the functioning of the motorized or manual guillotine 120 in the linerless printer. Water based PSA is easier to cut through mechanically in such devices with less adhesive residue left on the cutting blade or edge. Further, it is easier to achieve good anchorage with water based PSA onto the substrate 210 even without any additional primer being used.

Traditionally water based PSA adhesives have been difficult to use in linerless labels which comprise direct thermal face materials. There are limits for the highest temperatures that the direct thermal face materials can be exposed to in order to prevent unwanted and premature colour changes of the thermally sensitive coating.

This can be certain extent designed around by selecting a thermal face material having high enough activation temperature and then drying the adhesive at lower temperatures and perhaps additionally using lower adhesive coat weight. However, this sets limitations to the usable coat weight and typically leads to longer curing/drying time which again reflect into manufacturing efficiency and speed.

A further limitation set by a low adhesive coat weight in such approach is that it may reduce the anchorage of the PSA onto the face substrate. This in many cases leads to the use of additional primer or barrier coating in between the face and PSA in order to improve the otherwise poor anchorage. Further, a low coat weight has also a negative effect on PSA adhesion on labelled surface. Especially, if good adhesion and at the same time removability and/or repositionability is required, these call for higher coat weight of the PSA and this is especially emphasized in case of water based adhesives. Further, if the adhesive is to be dried at lower temperatures because of the sensitive thermal coating extra care needs to be taken that the adhesive becomes fully dried and achieves optimal pressure sensitive adhesion performance.

These challenges are solved herein by a specific manufacturing method which is in more detail explained in the chapter titled "Manufacturing".

An example of a water based PSA may be characterized as follows:

- acrylic based removable or ultra-removable PSA, for clean removability
- suitable for coating paper face stock wherein removability is required,
- suitable for high coating speeds,
- giving reticulation free coatings at coat weights of 10-30 $g/m^2$ (dry coat weight),
- plasticiser-free and can be used on thermal papers (including economy grades) without issues of premature image development or image fade,
- remaining fully removable from printed/over-lacquered surfaces,
- with sufficient anchorage and resistance to paper-penetration so that priming is not required,
- flat adhesion profile over extended dwell-time,
- sufficient cohesion to resist winging on curved surfaces.

Suitable performance values for a water based, acrylic removable adhesive according to an embodiment may be:

- maximum tack value of 12 N, preferably of 5 N as measured on glass according to FINAT test method FTM9
- maximum peel value of 6N, preferably of 3 N as measured according to FINAT test method FTM2.

It has further been noticed that use of pattern gumming, i.e. arranging adhesive in stripes in the longitudinal, machine direction of the label web is essential to achieve the necessary performance in the on-demand printer as well as the manual handling of the label after printing.

According to an embodiment, a linerless label product/web may comprise at least one, preferably all of the following properties:

- thermal paper with static sensitivity below 90 degrees C., or preferably below 80 degrees C.,
- no special primer between the thermal paper and PSA; which may be achieved by using high enough coat weight of the adhesive in order to ensure good anchorage,
- coat weight of PSA in the range of 15-20 $g/m^2$ (dry coat weight),
- acrylic based removable PSA arranged in one or more stripes in the middle part of the label web in longitudinal direction and PSA having high enough coat weight to ensure both good anchorage to the thermal paper and also providing good tack to different type of surfaces.

Figures 3A, 3B, 3C:
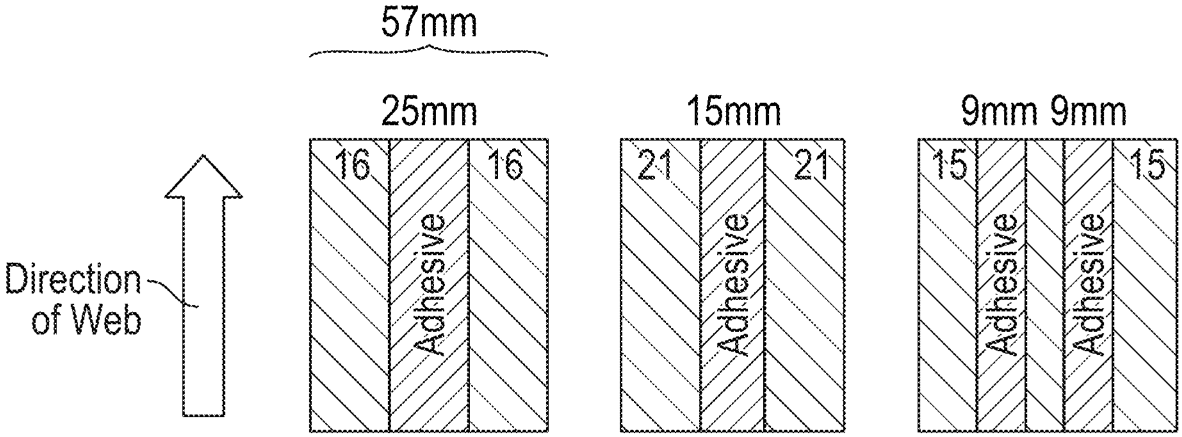
FIG. 3 illustrates exemplary embodiments of machine directional pattern gumming on linerless labels.

FIG. 3 shows exemplary embodiments of pattern gumming on linerless labels. In these embodiments the label web has a total width of 57 mm. In FIG. 3*a* one PSA stripe with a width of 25 mm is shown symmetrically in the middle of the label, FIG. 3*b* shows a narrower PSA stripe having a width of 15 mm in the middle, and FIG. 3*c* shows two 9 mm PSA stripes separated by a 9 mm gap. In each of these examples, a adhesive-free area of minimum 15 mm is left on both edges of the label web.

For a 57 mm wide label web, a single PSA stripe in the middle ranging in width from 10 to 25 mm provides good balance between tack and manual handling and most importantly, provides good long term performance in the compact, on-demand linerless printers. The rather wide non-adhesive area on the outer edges of the label prevent any bleeding of the adhesive in the label roll and aid keeping the printer mechanics clean. Yet, the PSA area is wide enough to provide good enough traction in the printer rolls in order to traction the label through the printer.

With a higher coat weight the PSA stripe(s) need to be made narrower in order to ensure that the linerless label product will go through the on-demand printer without issues. Surprisingly, this ratio between a coat weight expressed in $g/m^2$ and total width of the stripes in mm seems to follow approximately a linear relationship. For example, in a 57 mm wide label a single adhesive stripe of 17 mm may be used with 18 $g/m^2$ (dry) coat weight. If the adhesive stripe width would be increased to 34 mm, the (dry) coat weight would need to be reduced to order of 9 $g/m^2$. Such a low coat weight may not be preferable, as it may give raise to anchorage problems depending on how the adhesive is dried.

Typical linerless label product customer roll 200 may have a width of 57 or 102 mm. The above described findings can be generalized for the label widths so that optimally a total PSA coverage in a cross-direction of a label web may be less than 70%, or less than 50% or even less than 30%. The PSA may be arranged in one or more stripes in the cross-direction of the label web leaving one or more non-adhesive area(s) between those in the machine-direction continuous PSA stripes. However, it is also essential to leave in the machine-direction continuous non-adhesive areas/stripes near the longitudinal edges of the label web. These non-adhesive areas/stripes should correspond to minimum of 30%, or of 50% or even more than 70% of the total width of the label web and they should preferably be arranged symmetrically or nearly symmetrically on both longitudinal edges of the label web. If the width of the non-adhesive areas is selected to be non-symmetric, the narrower of these areas on either longitudinal edge of the label web should correspond to minimum of 10%, 15%, 25% or even more than 35% of the total width of the label web. The coat weight of a water based PSA may be in the range of 15-20 $g/m^2$ (dry coat weight), ensuring that with wider PSA stripes lower coat weights need to be selected.

Figures 4A, 4B, 4C:
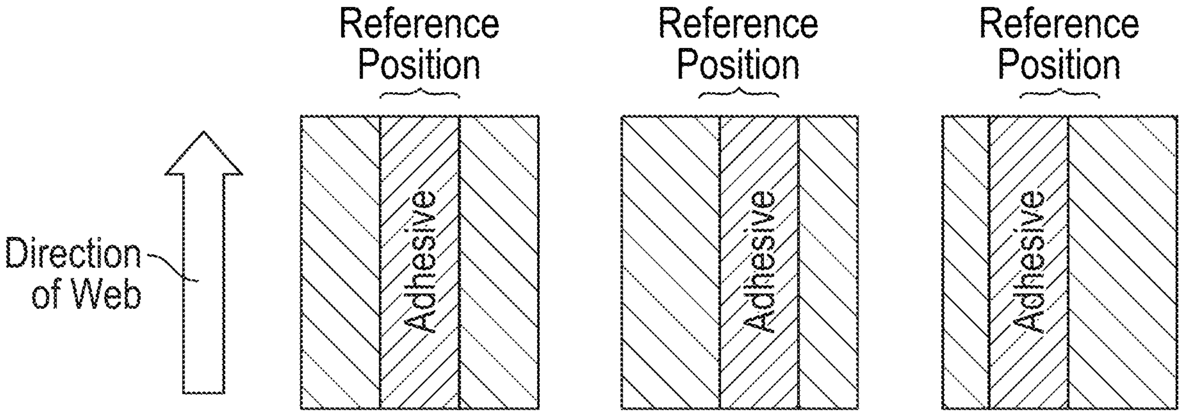
FIG. 4 illustrates exemplary embodiments of cross directional pattern gumming variation on linerless labels.

FIG. 4 illustrates exemplary embodiments of cross directional pattern gumming variation on linerless labels. In FIGS. 4*a*-4*c* the label web corresponds to the embodiment illustrated in FIG. 3*a* with a PSA stripe covering less than 50% of the total label width. In FIGS. 4*a*, 4*b* and 4*c* this PSA stripe has different cross-directional locations compared to the reference position shown in FIG. 4*a*. FIGS. 4*a*-4*c* may now correspond to different label rolls 200 (FIG. 2). This creates an effect that when such label rolls 200 are run through the on-demand printer 100, the adhesive engages in different parts of the printer internal mechanism and prevents fouling and adhesive residual build up in the printer components. In some cases the linerless face substrate may be able to even clean the printer when the non-adhesive parts become in contact with the printer components. The unwanted adhesive or residue build up may be most severe close to the border of the adhesive stripes and therefore even smaller variation of the location of the PSA stripes between consecutive rolls helps to keep the printer operational. Width, position and/or number of the PSA stripes may be different between separate label rolls.

One linerless label roll 200 may typically have a length of 40-80 metres and contain for example about 250-1500 labels depending on the length of the label. Thus, in order to print for example 100 000 labels with one printer, about 100 label rolls may be needed. It can be understood that when these rolls differ in the width, position and/or number of the PSA stripes, this may have substantial effect in helping to maintain the printer operational.

The alternating adhesive stripe positioning, width and/or the number between successive rolls can take place according to the total PSA coverage rules as described earlier and taking care that again the minimum non-adhesive area of 10% of the total width of the label web is maintained on both of the cross-directional edges of the label.

Manufacturing of the Linerless Labels

Heat sensitive layers or parts, i.e. direct thermal printable coating, of the label face substrate 210 have traditionally prevented utilizing water based adhesives with a linerless label. Such adhesives are typically dried in order to evaporate water after the adhesive has been applied on a face stock of a label. Use of water based adhesive necessitates drying, while any heat sensitive layer or part of a label may prohibit drying or heating close or above the activation temperature of the heat sensitive layer. Drying with lower temperatures and lower coat weight (i.e. with less mass to be dried) may be possible, but without very careful selection of drying process parameters would in turn cause at least ineffectiveness and longer drying times and/or dimensions (length) of the drying chamber or oven.

The problem with the face material of a label comprising thermal paper arises from heat sensitivity of the thermal paper. Thermal coating of a thermal paper is activated using heat. This may prevent drying and/or heating water based adhesive paper on a thermal paper, since heating may lead to activation and the thermal paper becoming blackish. The activated, black thermal paper surface prevents providing a visible print on it. Adhesive applied on a face stock comprising paper may penetrate onto the face stock and soften the face stock, or weaken hydrogen bonds in it. Thus the paper face stock may lose its qualities, which in turn may prevent further steps of label processing, like printing or die-cutting. In case of a plastic face stock, drying water based adhesive applied on a face stock has not been possible or has posed problems. For example polypropylene or polyethylene have not been suitable label face stock materials with a water based adhesive due to the high temperatures required in drying section which may cause melting or deformation of these filmic materials. The challenges are even more severe with thinner plastic film thicknesses which are a trend in order to save material and improve sustainability via lesser use of plastic materials.

According to an embodiment, the adhesive for the linerless label web is dried separately, before attaching the adhesive onto a face substrate of the label. This avoids problems arising from heat sensitivity and enables usage of environmentally friendly water based adhesives in such linerless labels. This approach allows a wider selection of substrate materials for the labels including substrate or coating materials even with lower physical or chemical performance but still fully valid for on-demand linerless printing and short-lived label applications. It should be understood that such label products do not need to be designed for the normal converting steps (printing, die-cutting, perforating, potential waste matrix removal etc.), but can be after manufacturing and slitting into customer rolls simply printed and manually dispensed for their final use. For such use, even lower grade and more economical materials can be used as the adhesive is separately dried using a separate belt or carrier.

According another embodiment, the water based adhesive is coated onto the label face substrate and dried therein. This may be achieved using lower adhesive coat weight. An additional primer layer in order to achieve proper anchoring of the adhesive to face may be needed. Further, also longer drying time at lower drying temperatures may be needed. This approach may provide a manufacturing route with fewer steps but on the other hand calls for very careful tailoring of the drying process and may put certain limitations on the selection of the substrate and other materials including the sensitivities of the thermal coating.

Methods

Figure 5:
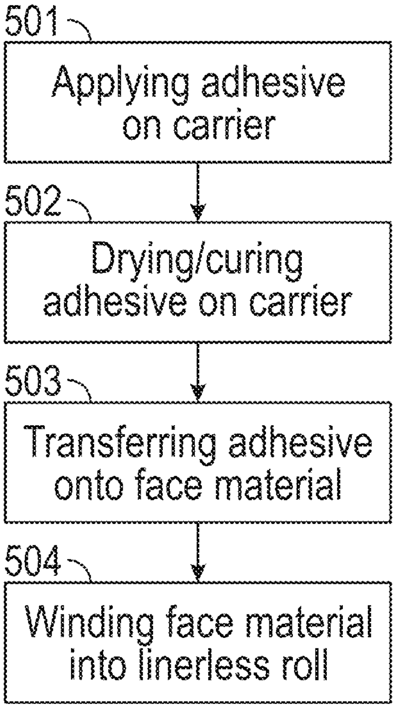
FIG. 5 illustrates manufacturing method steps according an embodiment.

FIG. 5 illustrates a method according to an embodiment. This method allows applying a PSA on a sensitive linerless face and forming a linerless label web without exposing the face to temperatures exceeding the activation temperature of the direct thermal coating material(s). Steps 501-504 may also be called phases or stages.

Water based adhesive is used here as an example, but the adhesive may also be a solvent based adhesive or a hot melt adhesive. These would require some changes in the details of the adhesive coating techniques when the adhesive is first applied onto a carrier used for drying/curing the adhesive, but such changes may be considered to be obvious for a person skilled in the art after understanding the general inventive concept. Further, use of other adhesive types to achieve PSA might cause some changes in the drying and/or curing of the adhesive on the carrier, but again such changes can be considered to be obvious for a person skilled in the art after understanding the general inventive concept.

Water based adhesive is in the first step 501 applied on a carrier. Then, in the second step 502, the water based adhesive is dried/cured on the carrier by conveying the carrier through a drier. The dried water based adhesive is transferred onto a face stock of a label in the third step 503. Finally the face material with the pressure sensitive adhesive is wound into a roll of linerless label web in the fourth step 504. In this process, the drying/curing of the adhesive takes place on a separate carrier and therefore the thermally sensitive coating(s) of the face are not exposed to temperatures exceeding the activation temperature of said coating.

In the following, two alternative approaches for the manufacturing method are described in more detail referring to FIGS. 6 and 7. The main difference between these two methods is how the carrier web used for drying the adhesive is arranged. According to an embodiment schematically described in FIG. 6, the carrier is arranged to be an endless belt. According to another embodiment schematically described in FIG. 7, the carrier is arranged to be a reusable batch of a web material.

For the purpose of this specification, in the following the term carrier may refer either to an endless belt or to a batch of a web material.

The carrier may be a silicone belt, a plastic belt, such as a nylon belt, or a metal belt, such as a steel belt. In the case of it being a batch of a web material, the carrier may be a filmic web material, preferably a polyethylene terephthalate (PET) web or other thin filmic material tolerating the drying temperatures.

The carrier may comprise at least one release coating. The carrier may comprise a single release coating layer or multilayer of the release coating. The release coating may have effect of increasing release effect of the carrier. The release coating on the carrier may enable to easily release the adhesive from the carrier. The adhesive may be dried and/or cured into PSA before detaching the adhesive from the carrier. The adhesive is detached from the carrier in order to apply and attach the adhesive on a face substrate of the label material. The adhesive may comprise a single adhesive layer or multilayer of adhesive.

The adhesive is dried/cured on the carrier. The adhesive on a carrier may be dried/cured in order to evaporate water from the water based adhesive. The adhesive may be dried/cured using at least one of induction energy, infrared energy, microwave energy or air blow. The adhesive may be dried/cured on one or both sides of the carrier, i.e. above and/or under the carrier. The adhesive may be dried/cured directly and/or indirectly. Drying/curing may be implemented indirectly by heating the carrier. Drying/curing may comprise utilizing air blow. Drying/curing may comprise utilizing air blow and another type of drying. The another type of drying may comprise infrared energy and/or induction energy. Drying/curing may comprise heating. Heating may be implemented by at least one or more of induction heating, infrared heating, air blow or microwave heating.

The dried/cured adhesive is applied onto a face stock. The face stock may comprise a single layer or multiple layers. The face stock may comprise plastic and/or paper. The label web comprising the face stock and the adhesive is wound up onto a roll.

Apparatus

Figure 6:
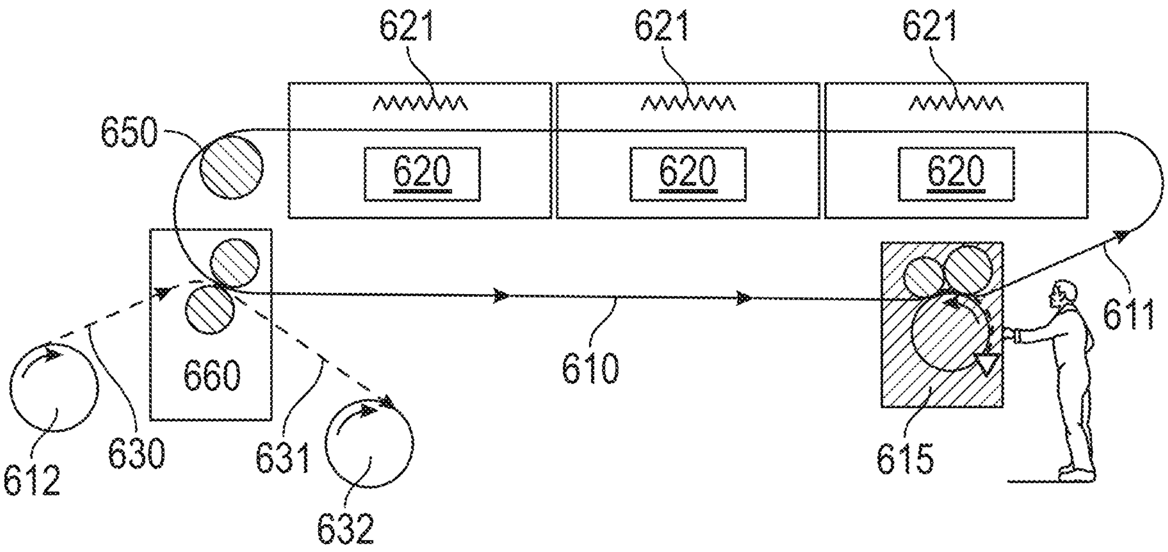
FIG. 6 illustrates, by way of an example, an embodiment of a manufacturing method and an apparatus based on an endless belt.

FIG. 6 illustrates an apparatus according to an embodiment. The apparatus comprises a belt 610. Water based adhesive is applied onto the belt by a coating unit 615. The coating unit 615 is arranged to apply the water based adhesive onto the belt 610. Coating may comprise roll coating, curtain coating, foam coating or spray coating. Coating may comprise a multilayer coating method. At least one water based adhesive layer may be applied onto the belt 610 by a contact coating method, preferably by a roll coating method.

In the coating method, the adhesive may be arranged to be pattern coated in order to provide pattern gumming. This means that the adhesive is coated onto the carrier, belt 610, in continuous parallel stripes running in machine direction, i.e. in longitudinal direction of the carrier. The width of the carrier, belt 610, is typically a multiple of the final customer roll width (FIG. 2). The width of the carrier may range, for example, from 1 to 3 metres. Therefore the carrier may be coated with multiple adhesive stripes in order to provide multiple individual label widths. Later the wider web width of the machine roll produced in this manufacturing process is to be slit into a correct customer roll width, for example having a width of 20-100 mm. A single machine roll may be coated using different adhesive patterns in different cross-directional positions (adhesive stripe locations) and thus used to produce different type of customer rolls. The slitting process may be used further to provide different adhesive stripe positions as schematically indicated in FIG. 4.

Pattern gumming in the first step 501 may be obtained using a contact coating method, such as roll coating, wherein the adhesive is coated onto a transfer roll using a nozzle. The nozzle may be arranged with blocking shims allowing the adhesive to be delivered only onto certain cross-directional positions on the transfer roll. Therefore, the adhesive coating on the carrier becomes also patterned. The adhesive pattern may be changed per need by adjusting or changing the blocking shims in the nozzle.

In FIG. 6 the water based adhesive on the belt 610 is dried in order to evaporate water from the water based adhesive. Drying may be implemented by one or more drying device (s) 621, 620. A drying device may utilize induction energy, infrared energy, microwave energy or air blow, for example. A drying device may comprise an induction heating device, an infrared heating device, a microwave heating device or an air dryer. Infrared heating device and/or induction heating device may be situated under the belt 610, or on a side of the belt opposite to the side of the belt on which the water based adhesive is applied. Air dryer or air jets may be arranged above the belt 610, or on a side of the belt onto which the water based adhesive is applied.

The apparatus of the FIG. 6 may comprise means for direct drying of the adhesive on the belt 610. The apparatus may comprise means for indirect drying of the adhesive on the belt 610. The apparatus may comprise both direct and indirect drying means. Indirect drying means may comprise means for heating the belt.

The apparatus in FIG. 6 comprises an unwinder 612 for a face stock 630 of a label web. The face stock comprises a web wound to a roll. The face stock 630 may be unwound from the roll. After dried, the water based adhesive is attached to the face stock. The unwound face stock 630 and the dried water based adhesive on the belt 610 are attached in a nip 660. A linerless label web 631 is formed. The formed linerless label web 631 is wound up to a roll 632. The label web roll 632 may be stored and/or transported for later processing. Label web roll 632 may be printed and/or die-cut. Label web roll 632 may be further processed in other location.

The apparatus of the FIG. 6 may further comprise a cooling cylinder 650. The cooling cylinder may be situated before the point wherein the dried water based adhesive layer is attached to the face stock. Speeds of the rolls in the apparatus of the FIG. 6 may be substantially the same in order to avoid damaging the face stock, for example stretching of a plastic face stock or tearing of a paper face stock. Speed difference between the rolls of the apparatus is preferably less than 0.5%.

The belt 610 may comprise silicone, plastic, for example nylon, or metal, for example steel. The belt may be solid and/or non-porous and/or nonpermeable. The belt may be non-permeable to adhesive. Adhesive may not penetrate to belt material. The belt may comprise a closed surface. An external surface of the belt may comprise roughness of 0.2-3.0 μm, preferably 0.4-1.0 μm, according to PPS 10 of ISO 8791. The belt 610 may comprise at least one release coating. The release coating has effect of increasing the release effects of the belt. The release coating may comprise at least one or multiple release coating layers. The release coating may comprise at least one silicone coating layer or at least one fluoropolymer based coating layer, for example polytetrafluoroethylene (PTFE) coating layer and/or fluorinated ethylene propylene (FEP) coating layer and/or perfluoroalkoxy (PFA) coating layer. The release coating may be non-permeable to adhesive.

Length of the belt and/or speed of the belt and/or temperature of the belt may be controllable. The belt length, speed and/or temperature have at least partly effect on drying the water based adhesive on the belt. The length of the belt may be at least 10 m, or at least 20 m, and not greater than 50 m or 40 m, or not greater than 35 m or 30 m. The speed of the belt may be 200-1200 m/min. Drying temperature of the water based adhesive on a belt may be 80-85 degrees C. or even higher. Preferably the drying temperature is at least 75 degrees C. to ensure that the water based adhesive becomes fully dried and provides maximum adhesive performance such as adhesion.

The at least one adhesive layer may be in contact with the belt for at least 1 s, or 1.5 s, preferably at least 1.8 s, or at least 2.0 s, and not longer than 8 s, preferably no longer than 10-20 s. Thickness of a metal belt may be for example 0.2-4.0 mm, preferably 1-2 mm. The density of the metal belt at the temperature of 20 degrees C. may be 7500-8500 $kg/m^2$, preferably 7700-8050 $kg/m^2$. Roughness of the belt coating may be 0.2-3.0 μm, preferably 0.4-1.0 μm, according to PPS 10 of ISO 8791. The thermal conductivity of the metal belt at the temperature of 20 degrees C. may be for example 13-21 W/mK, or 14-15 W/mK. The thermal conductivity of the metal belt at the temperature of 100 degrees C. may be for example 14-22 W/mK, or 15-16 W/mK. Temperature of a belt during the drying/curing process is dependent on adhesive. Temperature may be adjusted according to the adhesive. For example, temperature of the belt may be at most 50-65 degrees C. or at most 70-80 degrees C.; or the temperature of the belt may be at least 75 degrees C., and not higher than 125 degrees C., or 120 degrees C., preferably no higher than 115 degrees C. Speed of the belt may be at least 280 m/min, more preferably at least 200 m/min, or at least 300 m/min, most preferably at least 350 m/min, or at least 370 m/min.

Dryer or drying device(s) 620, 621 arranged to evaporate water from the water based adhesive may comprise an induction energy dryer, an infrared energy dryer, a microwave energy dryer or an air dryer. Other dryers or drying means are possible and may be utilized. A dryer or a drying device may dry, for example by heating, the water based adhesive directly or indirectly. The water based adhesive may be dried directly. In addition or alternatively drying means may be arranged to heat the belt and conduct or transfer the heat via the belt to the water based adhesive on the belt. The water based adhesive is thus dried (or heated) indirectly, though the belt. Heating the belt may be implemented at least partly with induction heating or infrared heating. Drying has effect of removing moisture from the water based adhesive on a belt.

In embodiments, wherein a metal belt is used, the water based adhesive may be dried from a first side or both sides of the metal belt. The first side may be the belt side, so that the water based adhesive is heated via the belt. In these embodiments induction energy or infrared energy may be utilized. Infrared energy may be gas infrared energy or electrical infrared energy. Alternatively or in addition the water based adhesive may be dried from the second side of the metal belt. The second side refers to the belt side, onto which the water based adhesive is applied. On the second side, for example infrared energy or air blow may be utilized. Microwave energy may be utilized on the side of the belt, to which the water based adhesive is applied. Microwave energy may be used to dry the water based adhesive on a belt directly. In addition or alternatively, air blow may be used to dry and/or remove moisture from said at least one water based adhesive. Both direct and indirect drying of water based adhesive may enable having a desired temperature profile in relation to drying time. This may have effect of saving time and energy during drying of the water based adhesive.

The induction energy may be utilized for drying. Induction drying may comprise a high frequency electrical heating. It may enable targeted drying or heating of the water based adhesive. An electrically conducting belt, for example a metal belt, may be heated by induction. Heat may be induced to the belt by circulating electrical currents. The frequency of an electromagnetic field used for heating may depend at least partly on belt size, belt material, coupling efficiency and electromagnetic field penetration depth. The induction heating may provide efficient combination of speed, consistency and control. Induction heating may provide repeatable and controllable heating process. The induction heating process may be controlled for example by choice of induction frequency, power density and interaction time. The induction heating may provide very accurate temperature control, which enables maximizing the used temperature with low tolerance. Higher temperature may speed up the drying process significantly. Adhesive performance of the water based adhesive may be improved due to less if any skinning of the adhesive during drying, compared to direct or sole direct drying. Since the belt is heated instead of ambient air or air only, energy used during drying process may be significantly decreased.

An infrared energy process may comprise an infrared gas heating process. The infrared gas heating device may use, for example, natural gas or propane as fuel gas. The infrared heating may be used instead or together with the induction heating. The infrared heating may be used instead or together with air blow. The infrared heater transfers energy through electromagnetic radiation. The infrared heater may dry the water based adhesive both directly and indirectly. The efficiency of the infrared heater may depend on matching the emitted wavelength and the absorption spectrum of the material or substance to be dried. The wavelength used for infrared heating comprises medium wave infrared range, for example 2-4 micrometres.

Air blow or air jets may be used to remove moisture from the water based adhesive. The air jets are preferably placed on, or directed towards, the side of the belt, on which the at least one water based adhesive layer is applied.

Figure 7:
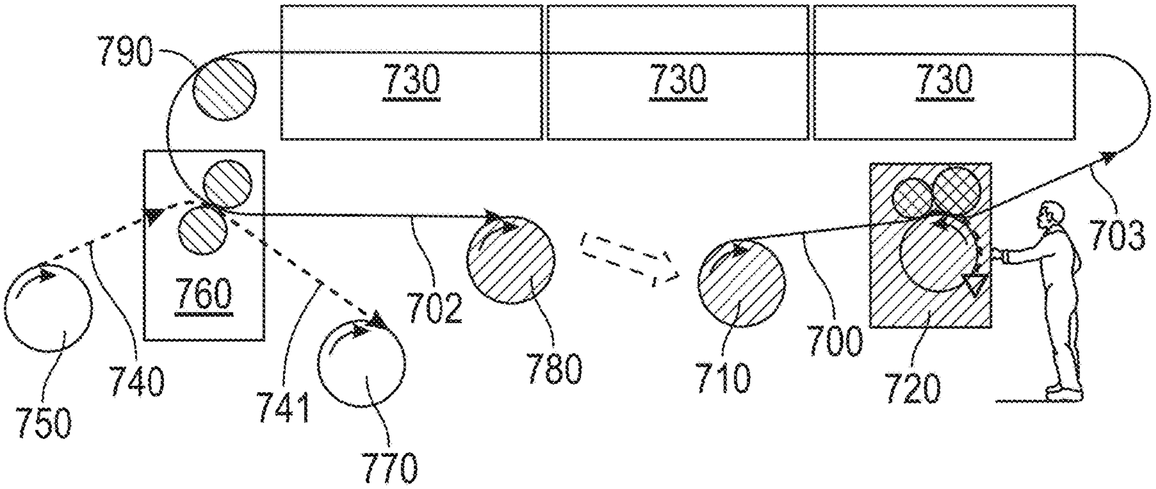
FIG. 7 illustrates, by way of an example, another embodiment of a manufacturing method and an apparatus based on a reusable batch of a carrier web material.

FIG. 7 illustrates schematically an alternative manufacturing method and an apparatus according to an embodiment. In this case instead of an endless belt, the carrier is arranged to be a reusable batch of a web material 700. This allows to run predetermined lengths of production as batches and reuse the carrier material several times. The benefits of this approach include, but are not limited to, possibility to use existing liner materials, for example siliconized PET liner as carrier.

Drying temperature of the water based adhesive on the carrier, for example on a siliconized PET liner, may be 80-85 degrees C. or even higher. Preferably the drying temperature is at least 75 degrees C. to ensure that the water based adhesive becomes fully dried and provides maximum adhesive performance such as adhesion.

In FIG. 7 a pre-siliconized carrier 700 is unwound at carrier unwinder 710 and guided to an adhesive coating station 720. The coated carrier is forwarded through a drier or series of driers 730. The face material 740 is unwound at face unwinder 750 and in order to meet the carrier 700 in a nip arrangement 760 wherein the adhesive from the carrier 700 is transferred onto the face material 740. After this transfer the linerless face material 741 together with the adhesive is rewound onto a machine roll using a linerless winder 770. The used carrier material 702 wherefrom the adhesive has been removed is guided to a carrier rewinder 780. The carrier material is reusable and may be transferred back to unwinder 710 for reuse.

Because the typical length of the linerless label web in customer rolls may be 20-100 metres, for example 40 metres, this makes the use of reusable carrier 700 for adhesive preparation viable. A single roll or batch of the carrier 700 can be used to produce linerless label web 741 for one or even several lengths required in customer rolls 200. For example, a single roll of the carrier material may have a length of 1000 m or more. This allows to run a batch corresponding to 10×100 m of customer roll lengths.

The apparatus of the FIG. 7 may further comprise a cooling cylinder 790. The cooling cylinder may be situated before the point wherein the dried water based adhesive is attached to the face stock. Similarly as in case of FIG. 6, the speed of the rolls in the apparatus of the FIG. 7 may be substantially the same in order to avoid damaging the face stock web, for example stretching of a plastic face stock or tearing of a paper face stock. Speed difference between the rolls of the apparatus is preferably less than 0.5%.

It should be understood that all heating/drying/curing methods explained earlier with respect to the endless belt embodiment in FIG. 6 are also applicable herein if they are suitable for the reusable batch carrier selected to be used.

According to an embodiment, a batch carrier may comprise pre-siliconized PET with at least one, preferably all of the following properties:

- PET film thickness ranging from 30-150 μm; strong enough to endure the physical stresses during use as a carrier,
- non-shrinking at the temperatures used during drying,
- pre-coated with a fully crosslinked release coating, for example silicone based release material,
- thermal or UV silicone coatings possible.

It should also be understood that all adhesive coating methods explained earlier with respect to the endless belt embodiment in FIG. 6 are also applicable herein. A preferable coating method is a transfer roll coating method explained in more detail with respect to FIG. 8.

Figure 8A:
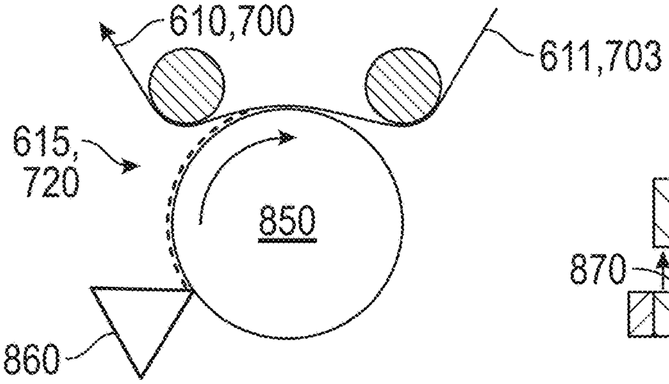
FIG. 8 illustrates, by way of an example, a contact coating method usable in a manufacturing method according to an embodiment.
Figure 8B:
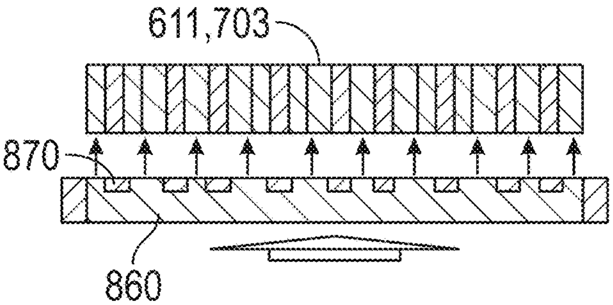

FIGS. 8*a* and 8*b* illustrate schematically contact coating method usable in a manufacturing method according to an embodiment. This coating method is usable both with the endless belt or reusable batch of web material approaches described with reference to FIGS. 6 and 7, respectively.

A transfer roll 850 is coated with an adhesive using a coating nozzle 860. The adhesive from the transfer roll 850 surface is picked up onto the carrier web 610, 700 forming adhesive coated carrier 611, 703.

For pattern gumming the coating nozzle 860 is arranged with blocking shims 870 allowing adhesive to the delivered only on certain cross-directional positions of the transfer roll 850. Therefore, the adhesive coating on the carrier 611, 703 becomes also patterned. The adhesive pattern may be changed per need by adjusting or changing the blocking shims 870 in the nozzle 860.

Illustrative Clauses

In the following various embodiments are expressed as illustrative clauses. It is possible to further combine one or more of these clauses in order to arrive to further embodiments described in more details together with their benefits earlier in this description.

Clause 1. A linerless label web comprising direct thermal printable coating and pressure sensitive adhesive, wherein total coverage of the pressure sensitive adhesive in cross direction of the label web in one or more stripes arranged along longitudinal direction of the web is less than 70%, or less than 50%, or less than 30%.

Clause 2. A linerless label web comprising direct thermal printable coating and pressure sensitive adhesive, wherein non-adhesive area in the cross direction of the label web in one or more stripes arranged along longitudinal direction of the web is at minimum 30%, or 50% or even more than 70% of total width of the label web.

Clause 3. A linerless label web comprising direct thermal printable coating and pressure sensitive adhesive, wherein non-adhesive areas are arranged as continuous stripes in machine direction of the web and on both longitudinal edges of the label web, and the narrower of these two non-adhesive stripes in the cross direction of the web corresponds to minimum of 10%, 15%, 25% or even more than 35% of total width of the label web.

Clause 5. A linerless label web comprising direct thermal printable coating and pressure sensitive adhesive, wherein adhesive coat weight (dry) is below 15 $g/m^2$ or below 10 $g/m^2$, and the adhesive is water based and dried after applying the wet adhesive onto the face of the label web.

Clause 6. A linerless label web comprising direct thermal printable coating and pressure sensitive adhesive, wherein adhesive coat weight (dry) is above 10 $g/m^2$ or above 15 $g/m^2$, and the adhesive is water based and dried before applying the adhesive on the face of the label web using a separate carrier for adhesive drying before transferring the dried adhesive onto the face substrate of the label web.

Clause 7. A linerless label product comprising direct thermal printable coating and pressure sensitive adhesive, wherein the adhesive is removable or repositionable adhesive.

Clause 8. A linerless label product comprising direct thermal printable coating and pressure sensitive adhesive, wherein the direct thermal printable coating has high static sensitivity.

Clause 9. A linerless label product comprising direct thermal printable coating and pressure sensitive adhesive, wherein a face comprises direct thermal paper with high dynamic sensitivity.

Clause 10. Use of a linerless label web comprising direct thermal printable coating and pressure sensitive adhesive in on-demand printing for preparation and delivery of orders.

Clause 11. Manufacturing method for a linerless label web comprising direct thermal printable coating and pressure sensitive adhesive and designed for on-demand printing for preparation and delivery of orders, wherein the method comprises drying of water based adhesive on a separate carrier before applying the water based adhesive on the face of the label web.

The invention claimed is:

1. A linerless label web (631, 741) comprising a direct thermal printable face (210, 630, 740) and a pressure sensitive adhesive (220), wherein the linerless label web (631, 741) comprises multiple label widths, the pressure sensitive adhesive (220) is arranged in one or more machine-direction continuous stripes leaving one or more non-adhesive area(s) between said machine-direction continuous stripes in a cross direction of the linerless label web, a total coverage of the pressure sensitive adhesive (220) in the cross direction of each label width is less than 70%, or less than 50%, or less than 30%, each label width comprises non-adhesive areas arranged as continuous stripes in machine direction of the web on both longitudinal edges of the label width, a minimum non-adhesive area being 10% of total label width in the cross direction of the linerless label web, the multiple label widths of the linerless label web (631, 741) differ in positioning, width and/or number of the machine-direction continuous stripes of the pressure sensitive adhesive (220).

2. The linerless label web (631, 741) according to claim 1, wherein a total coverage of non-adhesive area(s) in the cross direction of each label width in one or more stripes arranged along longitudinal direction of the linerless label web is at minimum 30%, or 50% or more than 70% of total label width.

3. The linerless label web (631, 741) according to claim 1, wherein non-adhesive areas are arranged as continuous stripes in machine direction of the web on both longitudinal edges of each label width, and the narrower of these two non-adhesive stripes arranged on longitudinal edges corresponds to minimum of 15%, 25% or more than 35% of total label width in the cross direction of the linerless label web.

4. The linerless label web (631, 741) according to claim 1, wherein a coat weight of the pressure sensitive adhesive is below 15 $g/m^2$ or below 10 $g/m^2$, and the pressure sensitive adhesive (220) is water based and dried after applying wet adhesive onto the thermally direct printable face (210, 630, 740) of the linerless label web.

5. The linerless label web (631, 741) according to claim 1, wherein a coat weight of the pressure sensitive adhesive is above 10 $g/m^2$ or above 15 $g/m^2$, and the pressure sensitive adhesive (220) is water based and dried before applying the adhesive onto the thermally direct printable face (210, 630, 740) of the linerless label web using a separate carrier (610, 700) for adhesive drying before transferring the dried adhesive onto the thermally direct printable face (210, 630, 740) of the linerless label web.

6. The linerless label web (631, 741) according to claim 1, wherein the pressure sensitive adhesive (220) is removable or repositionable adhesive.

7. The linerless label web (631, 741) according to claim 1, wherein the thermally direct printable face (210, 630, 740) comprises a direct thermal printable coating with high static sensitivity.

8. The linerless label web (631, 741) according to claim 1, wherein the thermally direct printable face (210, 630, 740) comprises a direct thermal printable coating with high dynamic sensitivity.

9. A linerless label product roll (200) manufactured by machine-direction slitting of a linerless label web (631, 741) according to claim 1.

10. The linerless label product roll according to claim 9, wherein the machine-direction continuous stripes of the pressure sensitive adhesive (220) differ in the positioning, width and/or number between individual linerless label product rolls (200).

11. Use of the linerless label web (631, 741) according to claim 1 in on-demand printing for preparation and delivery of orders.

12. A manufacturing method of a linerless label web (631, 741) comprising a direct thermal printable face (210, 630, 740) and a pressure sensitive adhesive (220) and designed for on-demand printing for preparation and delivery of orders, wherein the linerless label web comprises multiple label widths and the method comprises applying (501) a water based pressure sensitive adhesive (220) on a carrier (610, 700), drying/curing (502) the water based pressure sensitive adhesive (220) on the carrier (610, 700), transferring (503) the water based pressure sensitive adhesive (220) onto the direct thermal printable face (210, 630, 740), arranging a total coverage of the water based pressure sensitive adhesive (220) in cross direction of each label width to be less than 70%, or less than 50%, or less than 30%, arranging each label width with non-adhesive areas arranged as continuous stripes in-machine direction of the web on both longitudinal edges of the label width, a minimum non-adhesive area being 10% of total label width in the cross direction of the linerless label web, and winding (504) the direct thermal printable face (210) with the dried adhesive (220) thereon into a roll of linerless label web, wherein the multiple label widths of the linerless label web (631, 741) differ in positioning, width and/or number of the machine-direction continuous stripes of the pressure sensitive adhesive (220).

* * * * *